US 9,694,354 B2

(12) United States Patent
Aoki et al.

(10) Patent No.: US 9,694,354 B2
(45) Date of Patent: Jul. 4, 2017

(54) EXHAUST GAS CATALYST

(71) Applicant: TOYOTA JIDOSHA KABUSHIKI KAISHA, Toyota-shi, Aichi-ken (JP)

(72) Inventors: Yuki Aoki, Seto (JP); Hiromasa Suzuki, Toyota (JP); Ryota Onoe, Kakegawa (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/423,210

(22) PCT Filed: Sep. 25, 2013

(86) PCT No.: PCT/JP2013/005656
§ 371 (c)(1),
(2) Date: Feb. 23, 2015

(87) PCT Pub. No.: WO2014/080554
PCT Pub. Date: May 30, 2014

(65) Prior Publication Data
US 2015/0238951 A1    Aug. 27, 2015

(30) Foreign Application Priority Data

Nov. 20, 2012  (JP) ................................. 2012-254363

(51) Int. Cl.
*B01J 35/04*     (2006.01)
*B01D 53/94*    (2006.01)
(Continued)

(52) U.S. Cl.
CPC .......... *B01J 35/04* (2013.01); *B01D 53/9454* (2013.01); *B01J 23/63* (2013.01); *B01J 35/0006* (2013.01);
(Continued)

(58) Field of Classification Search
CPC ....... B01J 35/04; B01J 35/0006; F01N 3/035; F01N 2510/06; F01N 2510/0682;
(Continued)

(56) References Cited

U.S. PATENT DOCUMENTS 3,891,575  A  *  6/1975  Brautigam et al. ........... 502/247
4,886,711  A  *  12/1989  Foldvary ....................... 428/592
(Continued)

FOREIGN PATENT DOCUMENTS

CN          1411394 A          4/2003
EP         1 952 884 A1        8/2008
(Continued)

*Primary Examiner* — Maria Veronica Ewald
*Assistant Examiner* — Ethan Weydemeyer
(74) *Attorney, Agent, or Firm* — Sughrue Mion, PLLC

(57) ABSTRACT

An object of the present invention is to provide an exhaust gas catalyst that can achieve high purification performance. The exhaust gas catalyst includes: a base material (3) having a plurality of inner wall surfaces (7) formed by a plurality of through holes (5) penetrating therethrough from a first end surface (3*a*) to a second end surface (3*b*); and a plurality of catalyst layers (9) formed on the plurality of inner wall surfaces (7), respectively, wherein: each of the through holes (5) has a central axis (5X); each of the catalyst layers (9) is sectioned into a first region (9A) extending from the first end surface (3*a*) toward the second end surface (3*b*) by a predetermined distance, a second region (9B) extending from the second end surface (3*b*) toward the first end surface (3*a*) by a predetermined distance, and a third region (9C) placed between the first region (9A) and the second region (9B); and the catalyst layer (9) is formed such that a distance (h1) from the central axis (5X) of the through hole (5) to an inner surface (9*m*) of the catalyst layer (9) in the first region (9A) of the catalyst layer (9) is smaller than a distance (h3) from the central axis (5X) of the through hole (5) to the inner surface (9*m*) of the catalyst layer (9) in the third region (9C)

(Continued)

of the catalyst layer (9), but is larger than a distance (h2) from the central axis (5X) of the through hole (5) to the inner surface (9m) of the catalyst layer (9) in the second region (9B).

2 Claims, 19 Drawing Sheets

(51) Int. Cl.
*B01J 37/02* (2006.01)
*B01J 23/63* (2006.01)
*B01J 35/00* (2006.01)
*F01N 3/035* (2006.01)
*F01N 3/28* (2006.01)

(52) U.S. Cl.
CPC .......... *B01J 37/0244* (2013.01); *F01N 3/035* (2013.01); *F01N 3/2828* (2013.01); *B01D 2255/1021* (2013.01); *B01D 2255/1025* (2013.01); *B01D 2255/2065* (2013.01); *B01D 2255/20715* (2013.01); *B01D 2255/407* (2013.01); *B01D 2255/908* (2013.01); *B01D 2255/9035* (2013.01); *B01D 2258/014* (2013.01); *F01N 2330/06* (2013.01); *F01N 2510/06* (2013.01); *F01N 2510/0682* (2013.01); *F01N 2510/0684* (2013.01); *Y02T 10/22* (2013.01); *Y10T 428/24273* (2015.01)

(58) Field of Classification Search
CPC ....... F01N 2510/068284; F01N 3/2821; Y10T 428/24149; Y10T 428/24165; Y10T 428/24273; Y10T 428/24281; Y10T 428/24289; Y10T 428/24298; Y10T 428/24306; Y10T 428/24314; Y10T 428/24322; Y10T 428/24331; Y10T 428/24339; Y10T 428/24347; B32B 2250/00; B32B 2250/02–2250/05; B32B 2250/40; B32B 2250/42; B32B 2250/44; B32B 2307/752; B32B 2307/754; B32B 2315/02; B32B 2597/00

USPC ....... 428/141, 143, 144, 148, 156, 164, 167, 428/168, 116–118, 131–140, 188, 428/195.1–211.1; 502/1, 4, 439, 527.11, 502/527.12, 527.13, 527.18

See application file for complete search history.

(56) References Cited

U.S. PATENT DOCUMENTS

| 5,157,010 A | * | 10/1992 | Maus et al. | .................. 502/439 |
| 2009/0203515 A1 | * | 8/2009 | Murabayashi | ....... B01D 53/885 502/4 |
| 2012/0064360 A1 | * | 3/2012 | Althofer et al. | .............. 428/593 |

FOREIGN PATENT DOCUMENTS

| JP | 09-195757 A | 7/1997 | | |
| JP | 2005-334801 A | 12/2005 | | |
| JP | WO 2010131369 A1 | * 11/2010 | .............. B01J 23/63 |
| JP | 2011-212508 A | 10/2011 | | |
| JP | 2011212508 A | * 10/2011 | ............. B01D 53/94 |
| WO | WO 9955459 A1 | * 11/1999 | .......... B01J 37/0215 |

* cited by examiner

EXHAUST GAS CATALYST

TECHNICAL FIELD

The present invention relates to an exhaust gas catalyst for purifying exhaust gas discharged from an internal combustion engine.

BACKGROUND ART

As an exhaust gas catalyst for purifying exhaust gas discharged from an internal combustion engine, an exhaust gas catalyst configured such that a through hole is formed in a base material and a catalytic layer is provided on an inner wall surface formed by the through hole is described in the following prior art documents.

Patent Document 1 describes an exhaust gas catalyst converter configured such that catalyst carriers are placed in three stages in a casing along an exhaust gas flow direction with respective separation portions provided therebetween, and a pressure loss of each of the catalyst carriers is set to increase toward an outlet side, so that exhaust gas is stirred at the separation portions to be dispersed in a whole area, thereby improving purification efficiency.

Patent Document 2 describes an exhaust gas catalyst configured such that a catalyst portion from one side of a cell and a catalyst portion from the other side thereof are distanced from each other so as not to overlap with each other, thereby restraining an increase in a pressure loss due to the overlap between the catalyst portions.

Patent Document 3 describes an exhaust gas catalyst of which a thickness of a catalyst layer is decreased from both an upstream side and a downstream side of a through hole toward its center, so as to decrease a pressure loss of exhaust gas.

CITATION LIST

Patent Documents

Patent Document 1: Japanese Patent Application Publication No. 9-195757 (JP 9-195757 A)
Patent Document 2: Japanese Patent Application Publication No. 2005-334801 (JP 2005-334801 A)
Patent Document 3: Japanese Patent Application Publication No. 2011-212508 (JP 2011-212508 A)

SUMMARY OF THE INVENTION

Problem to be Solved by the Invention

In the meantime, a purification reaction of exhaust gas in a catalyst is determined by a reaction speed of each gas component, and a diffusion speed of the exhaust gas. Generally, the reaction speed is rate-limiting in a low-temperature range of 400° C. or less, while the diffusion speed is rate-limiting in a high-temperature range of 500° C. or more because the reaction speed is increased sufficiently, which, however, changes depending on precious metal species of the catalyst, a carrying amount thereof, and the like.

Exhaust gas of the internal combustion engine is generally discharged from each cylinder consecutively, so the exhaust gas pulsates. The exhaust gas also pulsates when the exhaust gas passes through an inside (through hole) of the catalyst. Since the flow of the exhaust gas is disturbed by the pulsation, gas diffusivity is high, which enables high purification efficiency by the catalyst. The gas diffusivity indicates that exhaust gas is diffused in the catalyst layer.

However, in a case where an air intake amount of the internal combustion engine is large, an exhaust-gas flow speed becomes fast, and therefore, a diffusion speed is insufficient relative to an amount of the exhaust gas. This causes such a concern that the exhaust gas cannot be completely purified by the catalyst. Further, in terms of a decrease in a pressure loss in the catalyst, it is demanded that a high purification function be achieved with a catalyst having a smaller base material capacity.

The present invention is accomplished in order to solve the above conventional problem, and is intended to provide an exhaust gas catalyst that can achieve high purification performance.

Means for Solving the Problem

In order to achieve the above object, an exhaust gas catalyst according to the present invention includes: a base material having a first end surface, a second end surface, and a plurality of inner wall surfaces formed by a plurality of through holes penetrating therethrough from the first end surface to the second end surface; and a plurality of catalyst layers formed on the plurality of inner wall surfaces, respectively, wherein: each of the through holes has a central axis; each of the catalyst layers is sectioned into a first region extending from the first end surface toward the second end surface by a predetermined distance, a second region extending from the second end surface toward the first end surface by a predetermined distance, and a third region placed between the first region and the second region; and the catalyst layer is formed such that a distance from the central axis of the through hole to an inner surface of the catalyst layer in the first region of the catalyst layer is smaller than a distance from the central axis of the through hole to the inner surface of the catalyst layer in the third region of the catalyst layer, but larger than a distance from the central axis of the through hole to the inner surface of the catalyst layer in the second region of the catalyst layer.

In such a configuration, the exhaust gas catalyst according to the present invention is configured such that the third region of the catalyst layer is recessed toward the base material relative to the first region and the second region of the catalyst layer so that a recessed portion is formed. This accordingly makes it possible to disturb flow of exhaust gas flowing from a first-end-surface side or a second-end-surface side to go along the through hole, thereby making it possible to improve diffusivity of the exhaust gas relative to the catalyst layer. As a result, the exhaust gas catalyst according to the present invention can achieve high purification performance.

Further, in the exhaust gas catalyst according to the present invention, the catalyst layer is also formed in the recessed portion. Accordingly, in comparison with a case where a recessed portion is provided such that a catalyst layer is not formed in some part, high purification performance can be achieved by a base material with a smaller capacity.

Further, in the exhaust gas catalyst according to the present invention, the recessed portion is formed inside the base material. Accordingly, high purification performance can be achieved at low cost, in comparison with a case where a recessed portion is formed by placing catalyst carriers in three stages in a casing along an exhaust gas flow direction with respective separation portions provided therebetween.

In the exhaust gas catalyst according to the present invention, when the first-end-surface side is an exhaust-gas inflow side and the second-end-surface side is an exhaust-gas outflow side, the third region is closer to the first-end-surface side than to the second-end-surface side.

In such a configuration, the exhaust gas catalyst according to the present invention is configured such that the recessed portion in the third region is closer to the first-end-surface side as the exhaust-gas inflow side than to the second-end-surface side. Accordingly, at the time of engine starting, the catalyst layer is warmed up from the exhaust-gas inflow side, so that the flow of the exhaust gas can be disturbed on the first-end-surface side on which a temperature of the catalyst layer is higher, thereby making it possible to improve the exhaust gas diffusivity on the first-end-surface side as the exhaust-gas inflow side. As a result, the exhaust gas catalyst according to the present invention can increase a warming up characteristic.

In the exhaust gas catalyst according to the present invention, when the first-end-surface side is an exhaust-gas inflow side and the second-end-surface side is an exhaust-gas outflow side, the third region is closer to the second-end-surface side than to the first-end-surface side.

In such a configuration, the exhaust gas catalyst according to the present invention is configured such that the recessed portion in the third region is closer to the second-end-surface side as the exhaust-gas outflow side than to the first-end-surface side. Accordingly, the flow of the exhaust gas can be disturbed on the second-end-surface side, thereby making it possible to improve the exhaust gas diffusivity on the second-end-surface side as the exhaust-gas outflow side. As a result, the exhaust gas catalyst according to the present invention can increase an OSC (Oxygen Storage Capacity) characteristic.

Advantageous Effects of Invention

According to the present invention, it is possible to provide an exhaust gas catalyst that can achieve high purification performance.

MODES FOR CARRYING OUT THE INVENTION

Figure 1A:
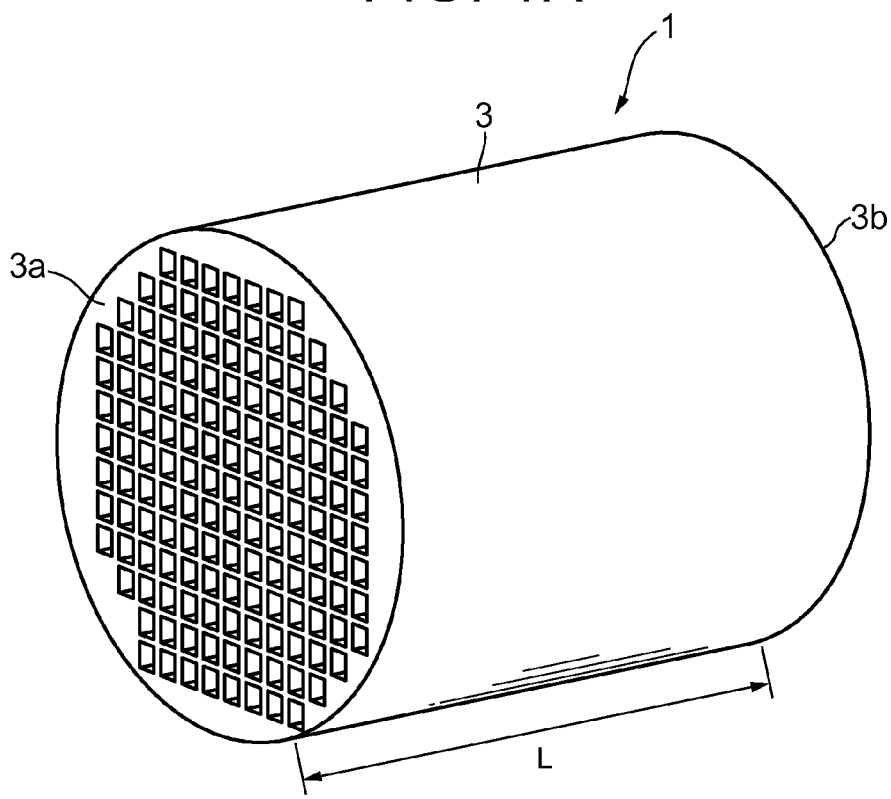
FIG. 1A is a perspective view illustrating a schematic configuration of an exhaust gas catalyst according to an embodiment of the present invention.
Figure 1B:
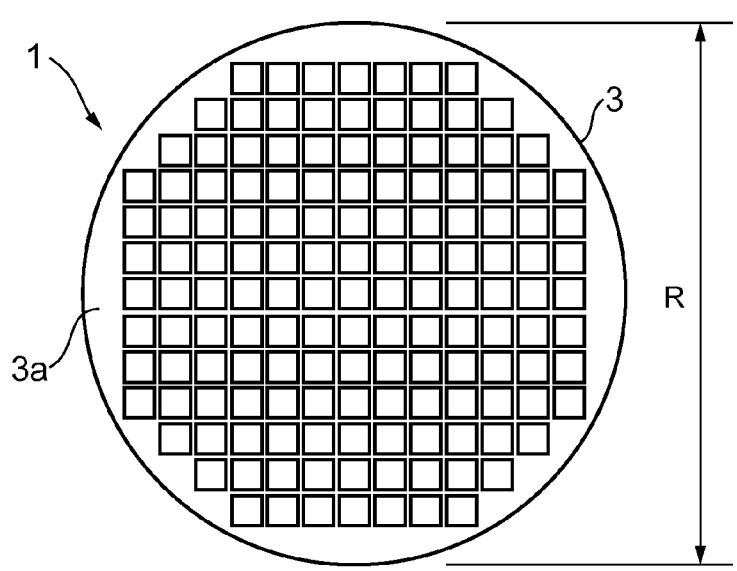
FIG. 1B is a side view of FIG. 1A when viewed from a first-end-surface side.
Figure 2:
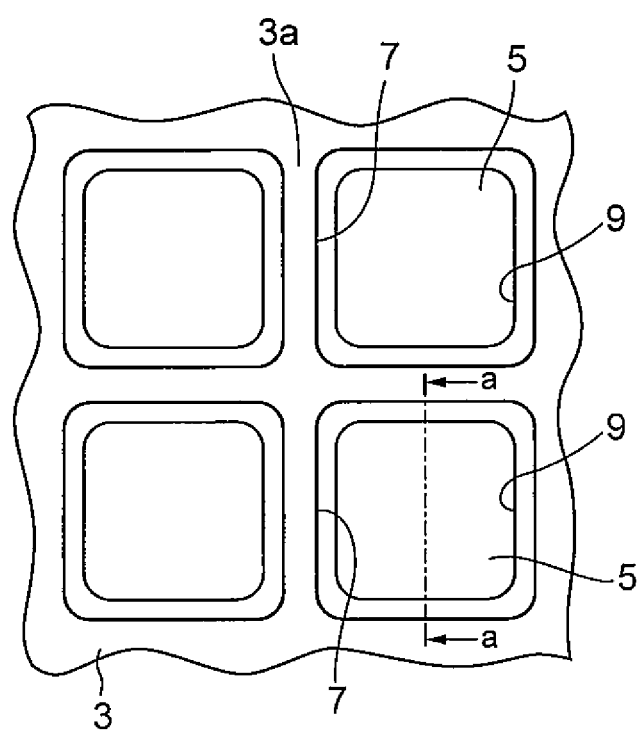
FIG. 2 is a view illustrating part of FIG. 1B in an enlarged manner.

An exhaust gas catalyst according to an embodiment of the present invention will be described below with reference to the drawings. The following embodiment deals with an example in which the present invention is applied to an exhaust gas catalyst for purifying exhaust gas discharged from a gasoline engine as an internal combustion engine. Note that FIGS. 4 to 6, FIG. 10, FIG. 14, FIG. 18, and FIG. 19 are sectional views each illustrating a sectional structure taken at the same position as a line a-a in FIG. 2.

Initially described is a configuration of an exhaust gas catalyst according to the embodiment of the present invention.

The exhaust gas catalyst 1 according to the present embodiment includes a base material 3 and a catalyst layer 9 as illustrated in FIGS. 1A to 3.

The base material 3 includes a first end surface 3a, a second end surface 3b, and inner wall surfaces 7 formed by through holes 5 penetrating therethrough from the first end surface 3a to the second end surface 3b. A plurality of through holes 5 is formed, so that a plurality of inner wall surfaces 7 is formed by the plurality of through holes 5.

The base material 3 is a monolith honeycomb base material made of heat-resistant ceramics such as cordierite, for example. The base material 3 has an appearance formed in a circular column shape, for example. The base material 3 is configured such that a length L thereof in a longitudinal direction is around 105 mm and a diameter R thereof is around 103 mm, for example.

The through hole 5 has a central axis 5X. For example, the through hole 5 is configured such that a sectional shape perpendicular to the central axis 5X is a rectangular shape, and a distance between the inner wall surfaces 7 opposed to each other is around 950 μm, for example.

A catalyst layer 9 is formed on each of the plurality of inner wall surfaces 7. The catalyst layer 9 is made of a material including alumina ($Al_2O_3$) as a carrier, platinum (Pt) as active species, rhodium (Rh), ceria-zirconia ($CeO_2$—$ZrO_2$) as an OSC substance, and the like.

Figure 3:
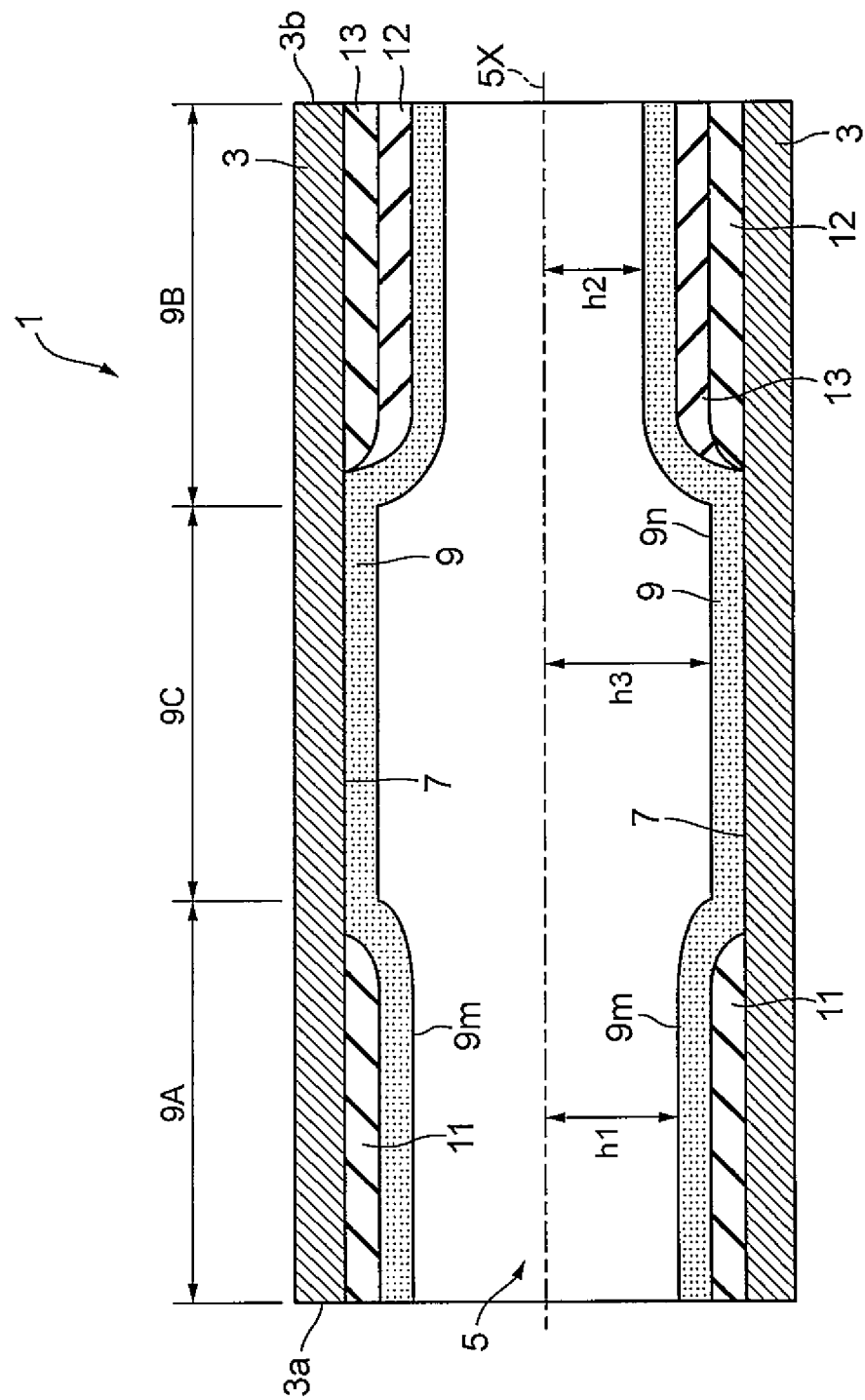
FIG. 3 is a sectional view illustrating a sectional structure taken along a line a-a in FIG. 2.

As illustrated in FIG. 3, in a direction of the central axis 5X of the through hole 5, the catalyst layer 9 is sectioned into a first region 9A extending from the first end surface 3a toward the second end surface 3b by a predetermined distance, a second region 9B extending from the second end surface 3b toward the first end surface 3a by a predetermined distance, and a third region 9C placed between the first region 9A and the second region 9B. The catalyst layer 9 is formed to satisfy a condition of h3>h1>h2, where h1 indicates a distance from the central axis 5X of the through hole 5 to an inner surface 9m of the catalyst layer 9 in the first region 9A, h2 indicates a distance from the central axis 5X of the through hole 5 to the inner surface 9m of the catalyst layer 9 in the second region 9B, and h3 indicates a distance from the central axis 5X of the through hole 5 to the inner surface 9m of the catalyst layer 9 in the third region 9C.

That is, the catalyst layer 9 is formed such that the distance h1 from the central axis 5X of the through hole 5 to the inner surface 9m of the catalyst layer 9 in the first region 9A is smaller the distance h3 from the central axis 5X of the through hole 5 to the inner surface 9m of the catalyst layer 9 in the third region 9C, but is larger than the distance h2 from the central axis 5X of the through hole 5 to the inner surface 9m of the catalyst layer 9 in the second region 9B.

Further, the catalyst layer 9 is formed such that the inner surface 9m is recessed in the third region 9C toward the base material 3 relative to the first region 9A and the second region 9B so that a recessed portion 9n is formed. The recessed portion 9n is formed annularly along the inner wall surface 7 in a direction perpendicular to the central axis 5X of the through hole 5.

Further, the catalyst layer 9 is formed such that the inner surface 9m has different heights in the first region 9A and in the second region 9B.

In the exhaust gas catalyst 1 according to the present embodiment, in order to satisfy the condition of h3>h1>h2, a dummy layer 11 is formed between the inner wall surface 7 of the base material 3 and the catalyst layer 9 in the first region 9A. Further, in the exhaust gas catalyst 1 according to the present embodiment, a dummy layer 12 and a dummy layer 13 are formed between the inner wall surface 7 and the catalyst layer 9 in the second region 9B. The dummy layer 11 is not formed in the second region 9B and the third region 9C. The dummy layer 12 and the dummy layer 13 are not formed in the first region 9A and in the third region 9C. A structure of the present embodiment which satisfies the condition of h3>h1>h2 is referred to as a recessed structure.

The catalyst layer 9 is formed to have a film thickness of around 100 μm, for example. The dummy layers 11, 12, and 13 are formed to have a film thickness of around 40 μm, for example. The dummy layers 11, 12, and 13 are ground layers of the catalyst layer 9, and are made of a material such as alumina that does not contribute to an exhaust gas purification reaction, for example.

A longitudinal length of the catalyst layer 9 is, for example, around 105 mm, which is the same as the length L of the base material 3. Each of the first region 9A, the second region 9B, and the third region 9C is configured such that a length along a direction of the central axis 5X of the through hole 5 is around 35 mm, for example. The third region 9C is configured to be continuous with the first region 9A and the second region 9B.

The third region 9C, namely, the recessed portion 9n is configured such that a center of its length along the direction of the central axis 5X of the through hole 5 is placed, for example, at a position of 50% of a length from the first end surface 3a to the second end surface 3b, that is, an overall length of the base material 3. The length of the recessed portion 9n is the length of the third region 9C.

The catalyst layer 9, each of the dummy layers 11, 12, 13, and the like are formed such that: the base material 3 is immersed in a solution in a state where the end surfaces of the base material 3 are parallel to a liquid level of the solution, so as to form a film on the inner wall surface 7; and then, a sintering process of hardening the film is performed. Accordingly, each of the dummy layers can be partially formed by controlling a position of the base material 3 to be immersed in the solution. Here, the catalyst layer 9 is made of the same composition in a whole region including the first region 9A, the second region 9B, and the third region 9C.

In the exhaust gas catalyst 1 configured as such, the recessed portion 9n is formed on the inner surface 9m of the catalyst layer 9. This makes it possible to disturb flow of exhaust gas flowing from a first-end-surface-3a side or a second-end-surface-3b side to go along the through hole 5, thereby making it possible to improve diffusivity of the exhaust gas relative to the catalyst layer 9.

Next will be described characteristics of the exhaust gas catalyst 1 according to the present embodiment with reference to Comparative Examples 1 to 3.

Exhaust gas catalysts according to Comparative Examples 1 to 3 basically have the same configuration as the exhaust gas catalyst 1 according to the present embodiment, but is different in a configuration related to the distances h1, h2, h3 from the central axis 5X of the through hole 5 to the inner surface 9m of the catalyst layer 9.

Figure 4:
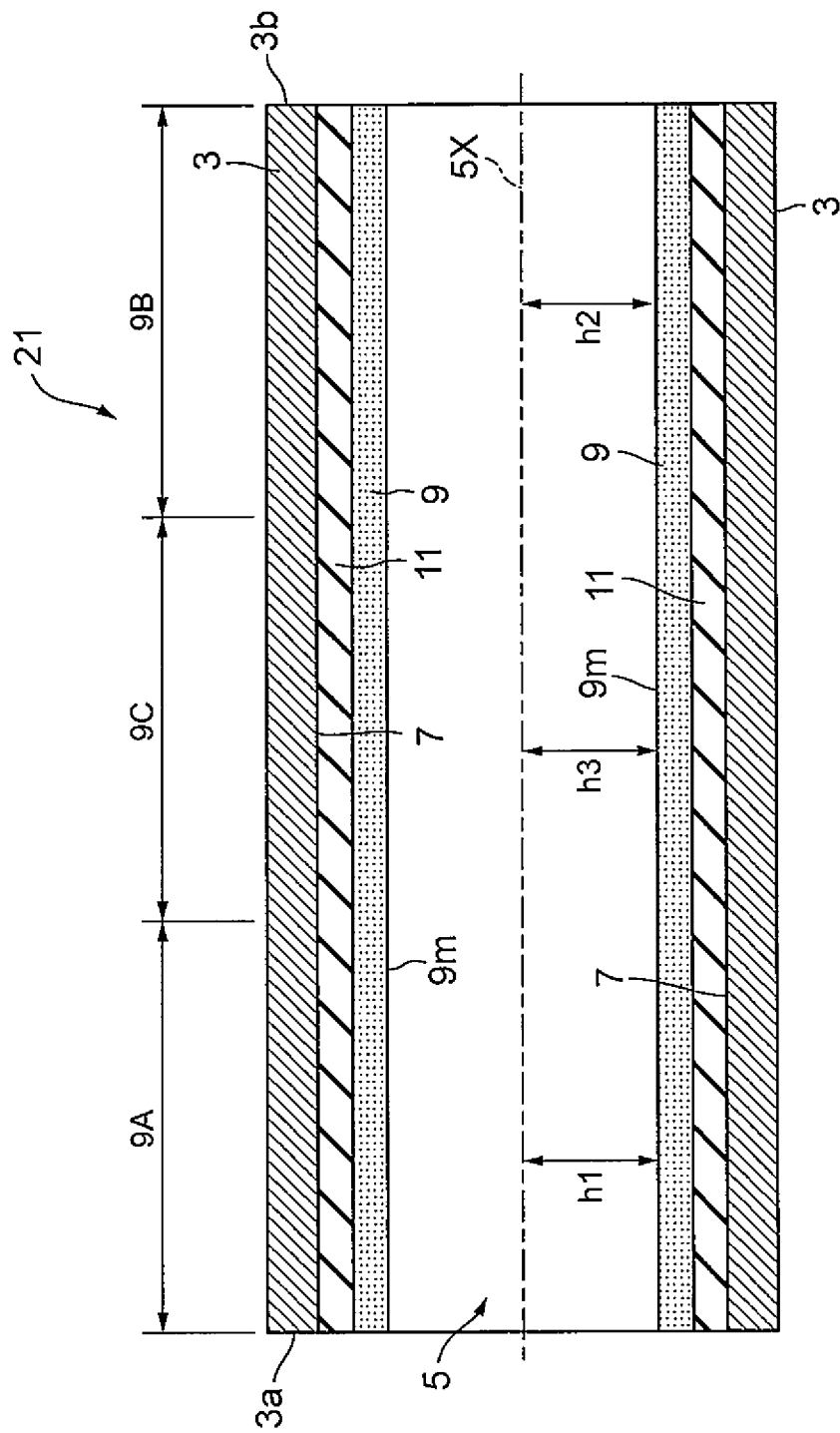
FIG. 4 is a sectional view illustrating a sectional structure of an exhaust gas catalyst of Comparative Example 1.

That is, as illustrated in FIG. 4, in an exhaust gas catalyst 21 of Comparative Example 1, a catalyst layer 9 is formed so as to satisfy a condition of h1=h2=h3. In order to satisfy this condition, in Comparative Example 1, a dummy layer 11 is formed between an inner wall surface 7 and the catalyst layer 9 over a first region 9A, a second region 9B, and a third region 9C. A structure of Comparative Example 1 which satisfies the condition of h1=h2=h3 is referred to as a planar structure.

Figure 5:
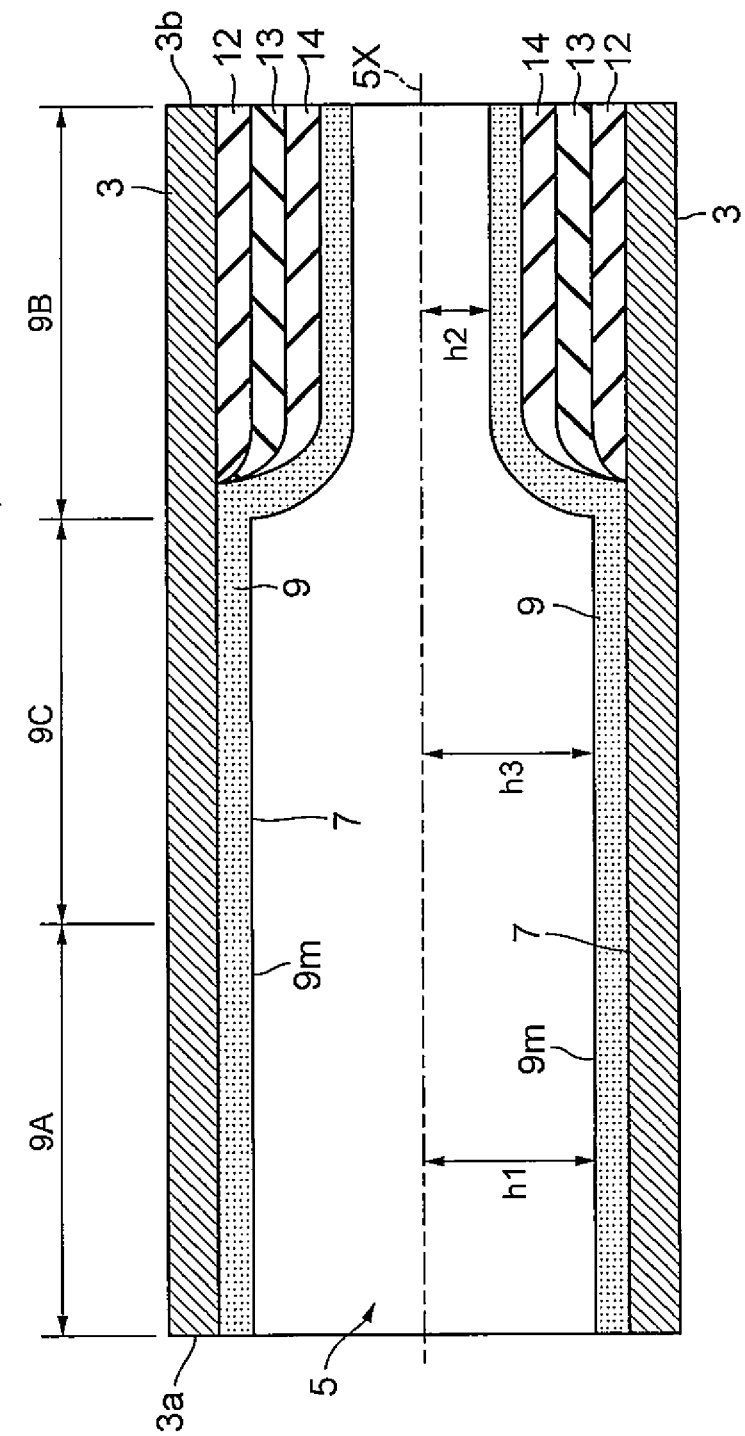
FIG. 5 is a sectional view illustrating a sectional structure of an exhaust gas catalyst of Comparative Example 2.

As illustrated in FIG. 5, in an exhaust gas catalyst 22 of Comparative Example 2, a catalyst layer 9 is formed so as to satisfy a condition of h1=h3>h2. In order to satisfy the condition, in Comparative Example 2, a dummy layer 12, a dummy layer 13, and a dummy layer 14 are partially formed between an inner wall surface 7 and the catalyst layer 9 in a second region 9B. The dummy layers 12, 13, and 14 are not formed in a first region 9A and in a third region 9C. A structure of Comparative Example 2 which satisfies the condition of h1=h3>h2 is referred to as a one-step structure. The dummy layer 14 is formed to have a film thickness of around 40 μm, similarly to the other dummy layers, for example. The dummy layer 14 is also formed by the same method as the other dummy layers.

Figure 6:
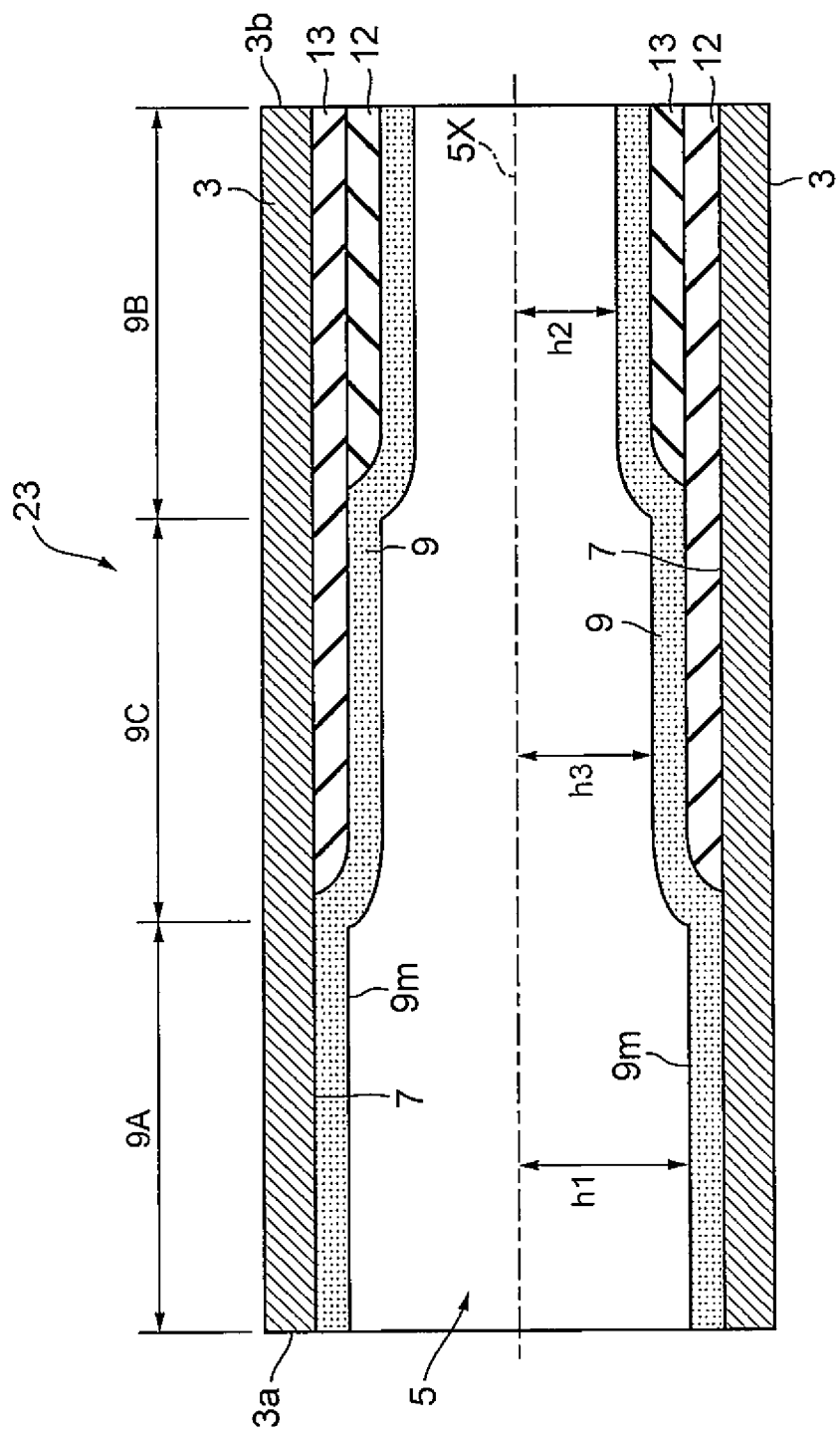
FIG. 6 is a sectional view illustrating a sectional structure of an exhaust gas catalyst of Comparative Example 3.

As illustrated in FIG. 6, in an exhaust gas catalyst 23 of Comparative Example 3, a catalyst layer 9 is formed so as to satisfy a condition of h1>h3>h2. In order to satisfy the condition, in Comparative Example 3, a dummy layer 12 and a dummy layer 13 are formed between an inner wall surface 7 and the catalyst layer 9 in a second region 9B. Further, in Comparative Example 3, the dummy layer 12 is formed between the inner wall surface 7 and the catalyst layer 9 in a third region 9C. The dummy layer 12 is not formed in a first region 9A. The dummy layer 13 is not formed in the first region 9A and the third region 9C. A structure of Comparative Example 3 is referred to as a two-step structure.

Figure 7:
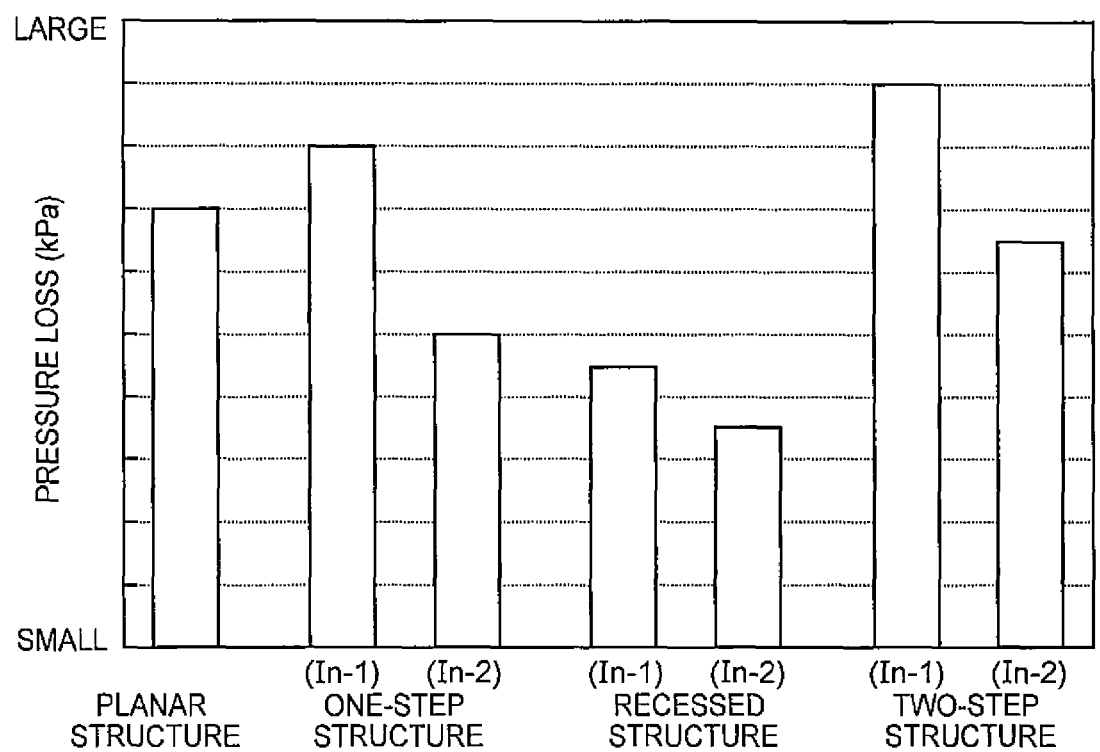
FIG. 7 is a graph showing results of pressure-loss measurement of the exhaust gas catalyst of the present embodiment and the exhaust gas catalysts of the comparative examples.
Figure 8:
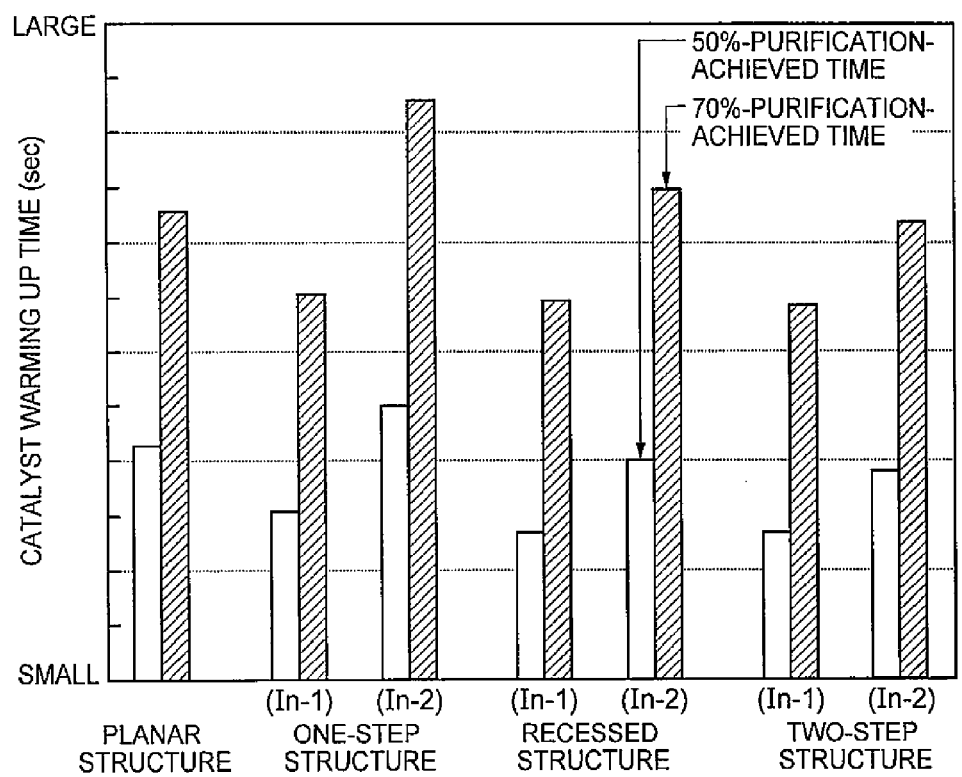
FIG. 8 is a graph showing results of a catalyst warming up characteristic of the exhaust gas catalyst of the embodiment of the present invention and the exhaust gas catalysts of the comparative examples.
Figure 9:
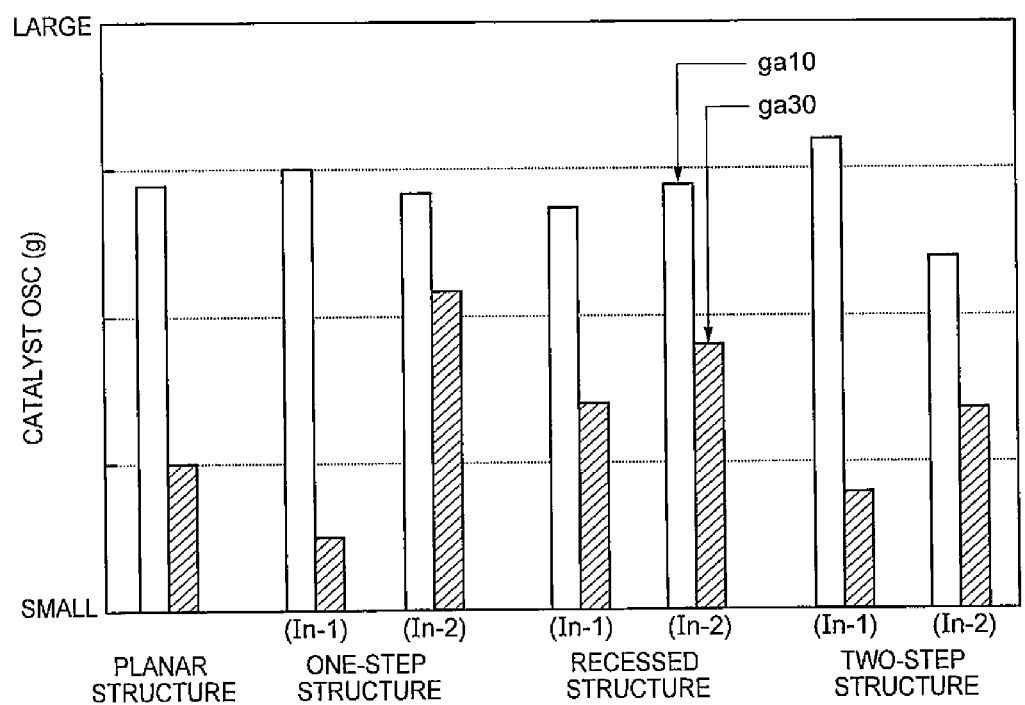
FIG. 9 is a graph showing results of catalyst OSC measurement of the exhaust gas catalyst of the embodiment of the present invention and the exhaust gas catalysts of the comparative examples.

FIGS. 7 to 9 are views showing results of measuring exhaust gas discharged from a gasoline engine through the catalysts of respective structures. In FIGS. 7 to 9, a recessed structure corresponds to the present embodiment as illustrated in FIG. 3. A planar structure corresponds to Comparative Example 1 illustrated in FIG. 4. A one-step structure corresponds to Comparative Example 2 illustrated in FIG. 5. A two-step structure corresponds to Comparative Example 3 illustrated in FIG. 6.

Further, in FIGS. 7 to 9, (In-1) indicates a case where the exhaust gas was flowed into the through hole 5 with the first-end-surface-3a side being taken as an exhaust-gas inflow side, and (In-2) indicates a case where the exhaust gas was flowed into the through hole 5 with the second-end-surface-3b side being taken as the exhaust-gas inflow side.

Further, in FIG. 7, a pressure loss (kPa) is a difference between a pressure of the exhaust gas on one end surface side and a pressure of the exhaust gas on the other end surface side in a state where the exhaust gas is supplied from the one end surface side.

Further, in FIG. 8, a catalyst warming up time (sec) indicates a time after the catalyst is cooled down to a room temperature by flowing the exhaust gas into another line so that the exhaust gas does not flow into the catalyst, until the catalyst becomes active when the exhaust gas is switched to flow into a catalyst line.

Here, a 50%-purification-achieved time in FIG. 8 indicates a time until a purification rate of hydrocarbon included in the exhaust gas reaches 50%. Similarly, a 70%-purification-achieved time indicates a time until the purification rate of hydrocarbon included in the exhaust gas reaches 70%.

Further, in FIG. 9, a catalyst OSC characteristic is calculated as follows: an A/F rich state (a state of fuel/air mixture of which an air-fuel ratio is higher than a theoretical air-fuel ratio) is continued until an O2 sensor provided behind the catalyst is turned into a rich state; just after that, an A/F lean state (a state of fuel/air mixture of which the air-fuel ratio is lower than the theoretical air-fuel ratio) is caused; a time taken for the O2 sensor provided behind the catalyst to be turned into a lean state after the A/F lean state is caused is obtained; and the catalyst OSC characteristic is calculated from the time. Here, ga10 indicates a case where an air intake amount of the engine is 10 g/sec, and ga30 indicates a case where the air intake amount of the engine is 30 g/sec. The intake air amount becomes high when a load of the engine increases or when an aperture of a throttle increases.

As illustrated in FIG. 7, the pressure loss tends to be higher in the case of (In-1) in which the first-end-surface-3a side is the exhaust gas inflow side, in any of the one-step structure, the recessed structure, and the two-step structure. Further, in the recessed structure, the pressure loss is decreased in either of the case (In-1) in which the first-end-surface-3a side is the exhaust-gas inflow side and the case (In-2) in which the second-end-surface-3b side is the exhaust-gas inflow side, in comparison with the planar structure, the one-step structure, and the two-step structure.

As illustrated in FIG. 8, in any of the one-step structure, the recessed structure, and the two-step structure, the catalyst warming up time is shorter in the case (In-1) in which the first-end-surface-3a side is the exhaust-gas inflow side and the pressure loss is high. Here, the recessed structure according to the present embodiment exhibits a pressure loss that is lower than those of the planar structure, the one-step structure, and the two-step structure, but has an excellent warming up characteristic. This is because gas diffusivity of the catalyst layer 9 is improved and purification performance is improved at a stage where the catalyst receives heat from the exhaust gas and is warmed up slowly from a front part of a gas inflow side.

As illustrated in FIG. 9, the ga10 with a low air intake amount is not so different in terms of a value of OSC. In contrast, in the ga30 with a high air intake amount, in any of the one-step structure, the recessed structure, and the two-step structure, the case (In-2) in which the second-end-surface-3b side is the exhaust-gas inflow side and the pressure loss is low exhibits a high OSC.

In this examination, since oxygen discharge of the catalyst is caused from the front part on the gas inflow side, the front part of the catalyst on the gas inflow side finishes reacting in any of the structures, and a structure without a dummy layer in a rear part of the catalyst on a gas outflow side is decreased in an exhaust-gas flow speed, and thus, has a larger OSC characteristic. Although the recessed structure of FIG. 3 has a dummy layer in a rear part of the catalyst on the gas outflow side, the OSC characteristic of the catalyst is large. This means that diffusivity inside the catalyst is improved, so that an oxygen-releasable amount increases, and thus, the recessed structure has a large OSC.

Based on the foregoing, by forming the recessed portion 9n inside the catalyst, the flow of the exhaust gas can be disturbed, thereby making it possible to increase the gas diffusivity to diffuse the exhaust gas in the catalyst layer 9, and to improve purification performance.

Next will be described an effect of the exhaust gas catalyst 1 according to the present embodiment.

The exhaust gas catalyst 1 according to the present embodiment is configured such that the third region 9C of the catalyst layer 9 is recessed toward the base material 3 relative to the first region 9A and the second region 9B of the catalyst layer 9 so that the recessed portion 9n is formed. This makes it possible to disturb the flow of the exhaust gas flowing from the first-end-surface-3a side or the second-end-surface-3b side to go along the through hole 5, thereby making it possible to improve gas diffusivity to diffuse the exhaust gas in the catalyst layer 9. As a result, the exhaust gas catalyst 1 according to the present invention can achieve high purification performance.

In the exhaust gas catalyst 1 according to the present embodiment, the catalyst layer 9 is also formed in the recessed portion 9n. Accordingly, high purification performance can be achieved by the base material 3 with a smaller capacity, in comparison with a case where a recessed portion is provided such that a catalyst layer is not formed in some part.

Since the recessed portion 9n is formed inside the base material 3, the exhaust gas catalyst 1 according to the present embodiment can achieve high purification performance at low cost, in comparison with a case where a recessed portion is formed by placing catalyst carriers in three stages in a casing along an exhaust gas flow direction with respective separation portions provided therebetween.

In the exhaust gas catalyst 1 according to the present embodiment, the inner surface 9m of the catalyst layer has different heights in the first region 9A of the catalyst layer 9 and in the second region 9B thereof. Accordingly, in comparison with a case where the inner surface 9m of the catalyst layer 9 does not have different heights in the first region 9A of the catalyst layer 9 and in the second region 9B thereof, the flow of the exhaust gas can be disturbed more.

The exhaust gas catalyst 1 according to the present embodiment deals with a case where the length of the recessed portion 9n is 35 mm. However, the exhaust gas catalyst 1 according to the present embodiment is not limited to this, and the length of the recessed portion 9n may be changed.

Further, the exhaust gas catalyst 1 according to the present embodiment deals with a case where the center of the length of the third region 9C, namely, the recessed portion 9n is placed at a position of 50% of the length of the base material 3 from the first end surface 3a to the second end surface 3b. However, the exhaust gas catalyst 1 according to the present embodiment is not limited to this, and the position of the recessed portion 9n may be changed.

Next will be described the length of the recessed portion 9n of the exhaust gas catalyst 1 according to the present embodiment, with reference to FIGS. 10 to 13.

Figure 10:
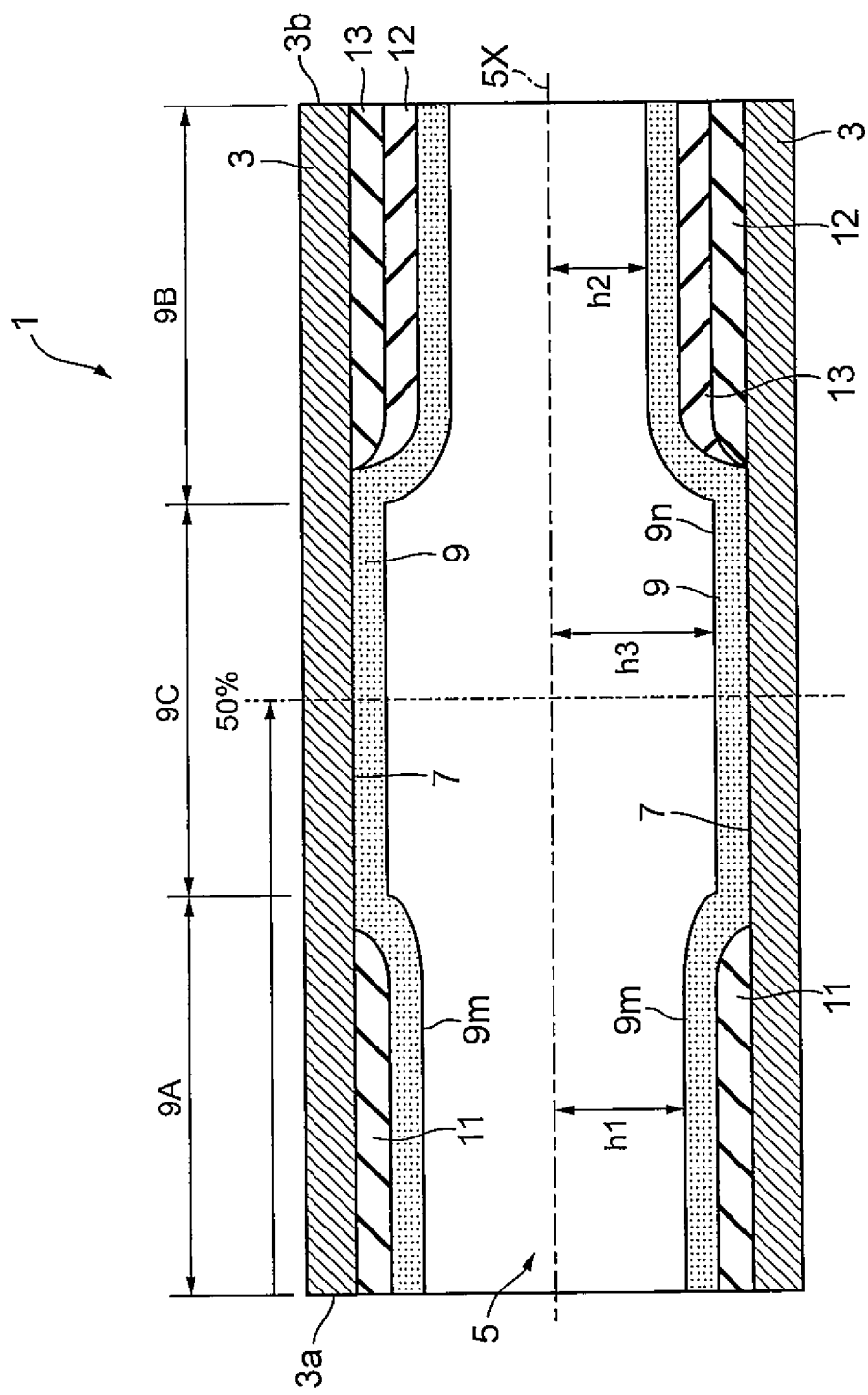
FIG. 10 is a sectional view to describe a position of a recessed portion in the exhaust gas catalyst according to the embodiment of the present invention.
Figure 11:
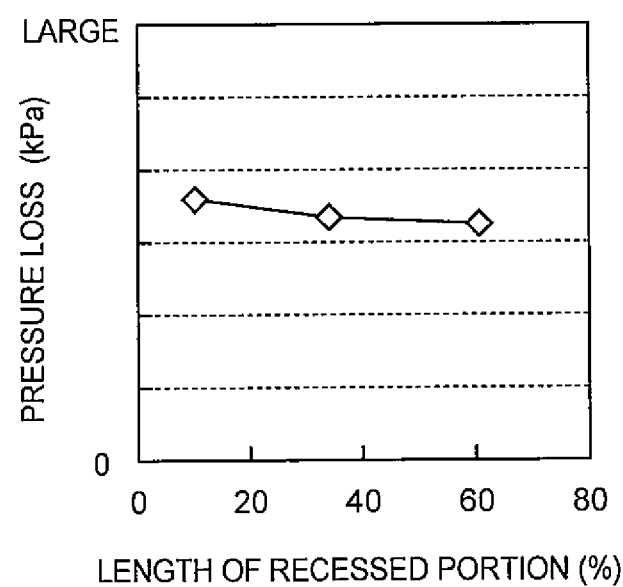
FIG. 11 is a graph illustrating a relationship between a length of the recessed portion and a pressure loss in the exhaust gas catalyst according to the embodiment of the present invention.
Figure 12:
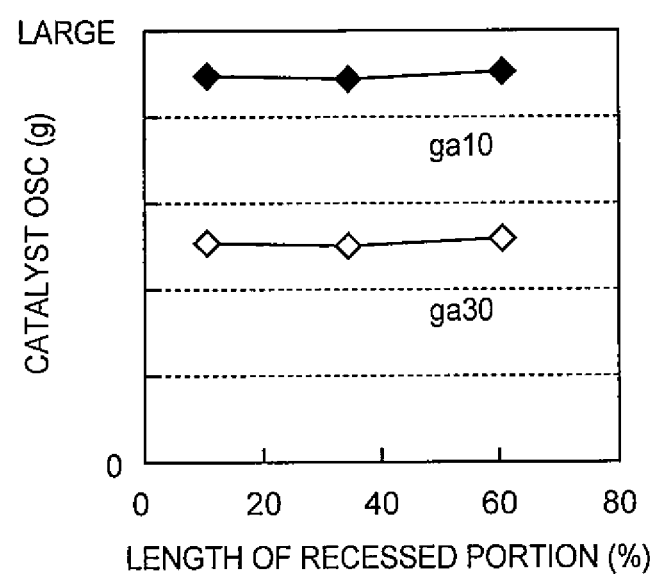
FIG. 12 is a graph illustrating a relationship between the length of the recessed portion and a catalyst OSC in the exhaust gas catalyst according to the embodiment of the present invention.
Figure 13:
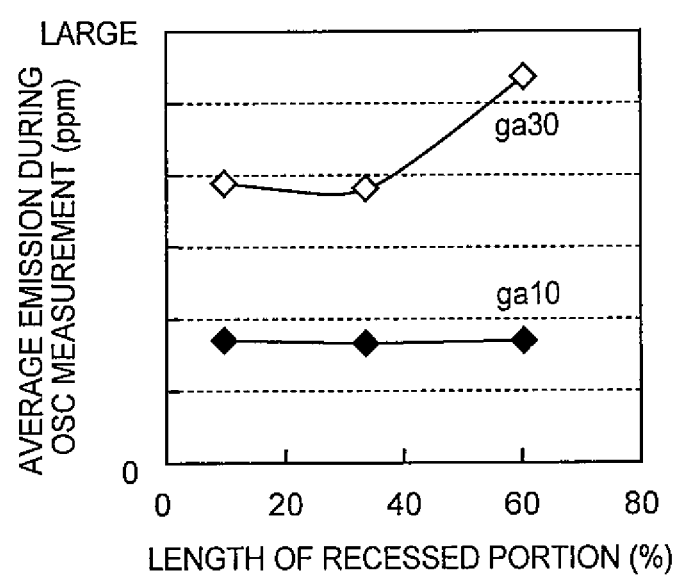
FIG. 13 is a graph illustrating a relationship between the length of the recessed portion and an average emission during OSC measurement in the exhaust gas catalyst according to the embodiment of the present invention.

FIGS. 11 to 13 are views showing results of measurements performed such that the exhaust gas discharged from the gasoline engine was flowed to respective catalysts different in the length of the recessed portion 9n. As illustrated in FIG. 10, the measurement was performed by use of catalysts each having a structure in which the center of the length of the recessed portion 9n was placed at a position of 50% of the overall length from the first end surface 3a to the second end surface 3b and in which the length of the recessed portion 9n was set to 10%, 34%, or 60% of the overall length of the base material 3. The other structures except this are basically the same as FIG. 3. Characteristics of these samples are shown in FIGS. 11 to 13. Each of the characteristics was obtained when the exhaust gas was flowed into the through hole 5 with the first-end-surface-3a side being taken as the exhaust-gas inflow side.

As illustrated in FIG. 11, the pressure loss decreases as the length of the recessed portion 9n is longer. As illustrated in FIG. 12, the catalyst OSC hardly changes depending on the length of the recessed portion 9n. As illustrated in FIG. 13, in the ga10 with a low air intake amount, an average emission of hydrocarbon during the OSC measurement is generally the same in each length. On the other hand, in the ga30 with a high air intake amount, when the length of the recessed portion 9n is 10% to 34% of the overall length, the emission is slightly good. However, when the length of the recessed portion 9n becomes longer than that, the emission suddenly turns worse.

Based on the foregoing, it is preferable that the length of the recessed portion 9n be around 30% relative to the overall length of the base material 3.

Next will be described a position of the recessed portion 9n of the exhaust gas catalyst 1 according to the present embodiment, with reference to FIGS. 14 to 17.

Figure 14:
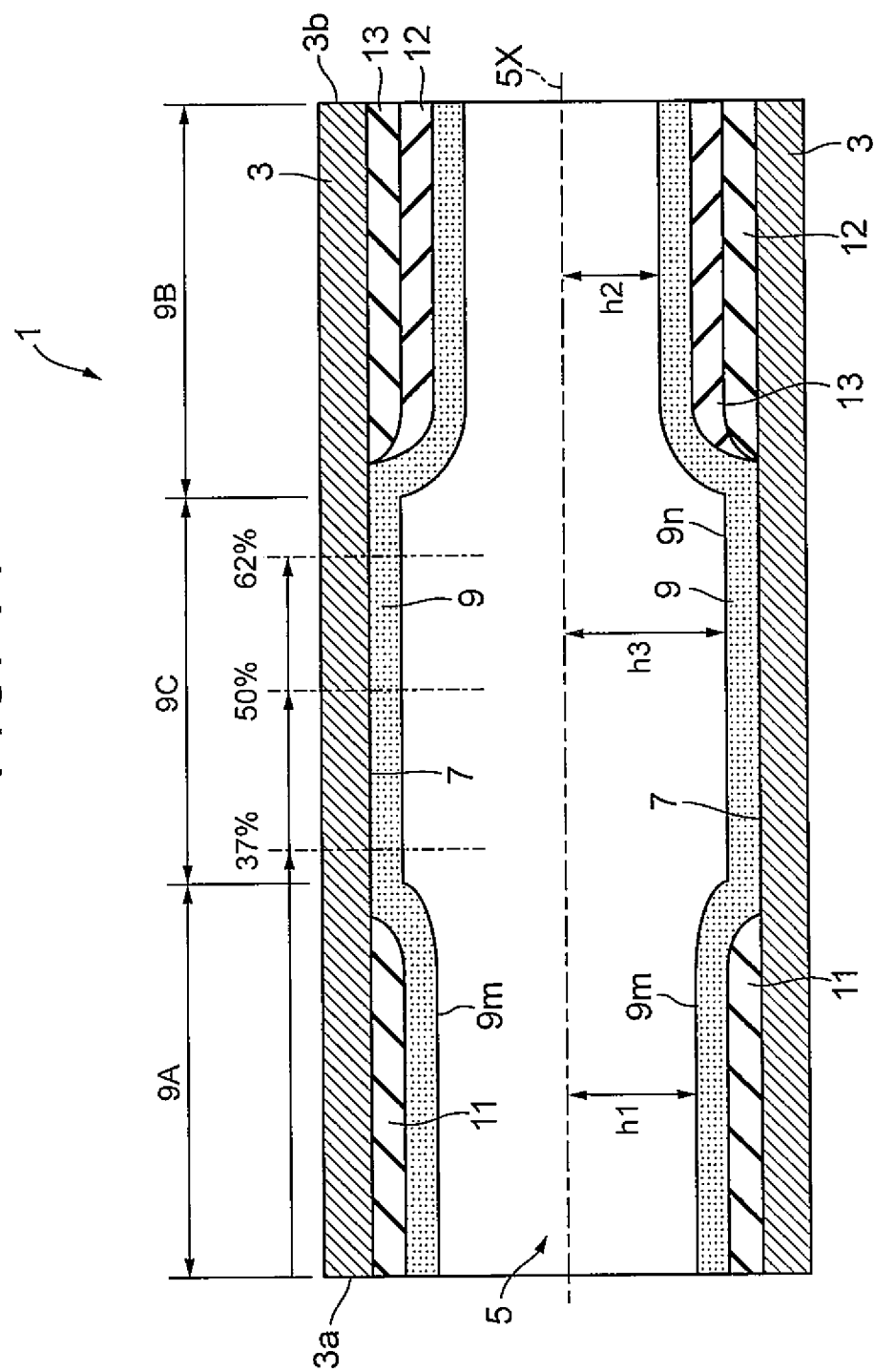
FIG. 14 is a sectional view to describe the position of the recessed portion in the exhaust gas catalyst according to the embodiment of the present invention.
Figure 15:
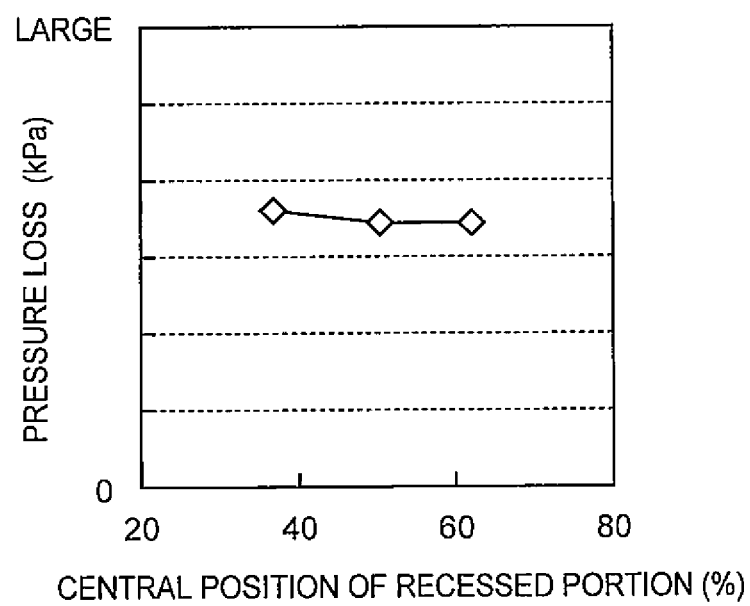
FIG. 15 is a graph showing a relationship between a central position of the recessed portion and the pressure loss in the exhaust gas catalyst according to the embodiment of the present invention.
Figure 16:
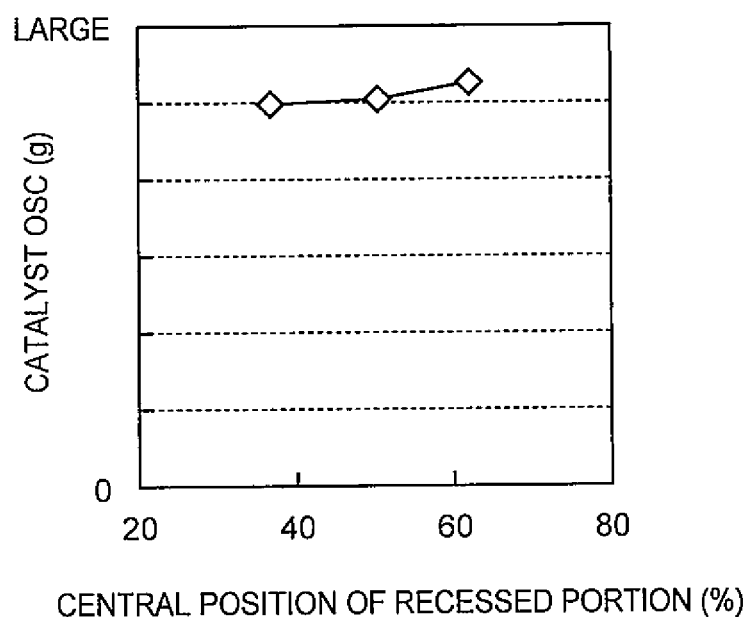
FIG. 16 is a graph showing a relationship between the central position of the recessed portion and the catalyst OSC in the exhaust gas catalyst according to the embodiment of the present invention.
Figure 17:
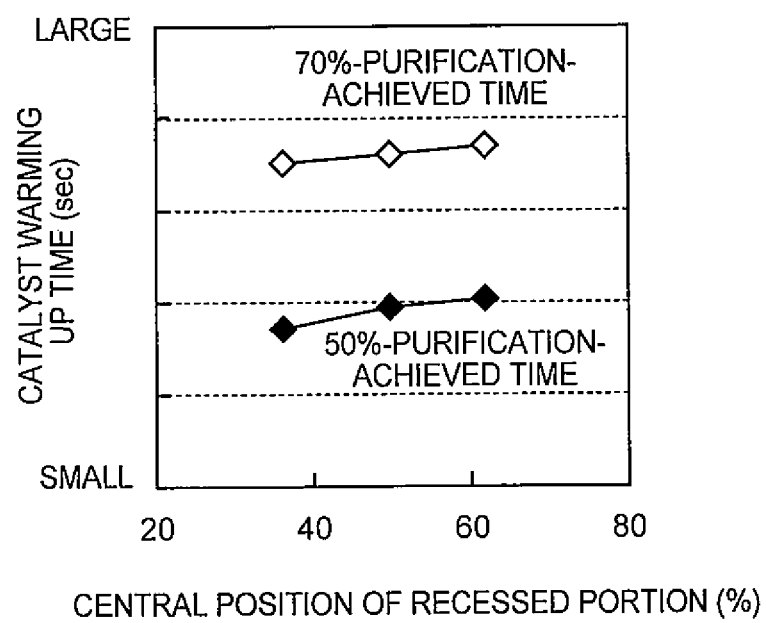
FIG. 17 is a graph showing a relationship between the central position of the recessed portion and a catalyst warming up time in the exhaust gas catalyst according to the embodiment of the present invention.

FIGS. 15 to 17 are views showing results of measurements performed such that the exhaust gas discharged from the gasoline engine was flowed to respective catalysts different in the position of the recessed portion 9n. As illustrated in FIG. 14, the measurements were performed by use of catalysts each having a structure in which the center of the recessed portion 9n having a length of 34% relative to the overall length of the base material 3 was placed at a position of 37%, 50%, or 62% of the overall length of the base material 3 from the first end surface 3a to the second end surface 3b. The other structures except this are basically the same as FIG. 3. Characteristics of these catalysts are shown in FIGS. 15 to 17. Each of the characteristics was obtained when the exhaust gas was flowed into the through hole 5 with the first-end-surface-3a side being taken as the exhaust-gas inflow side.

As illustrated in FIG. 15, the pressure loss becomes higher as the center of the length of the recessed portion 9n approaches the first-end-surface-3a side. This is because, as the center of the length of the recessed portion 9n approaches the first-end-surface-3a side, the length of the second region 9B where the inner surface 9m of the catalyst layer 9 is closer to the central axis 5X of the through hole 5 than in the first region 9A becomes longer. As illustrated in FIG. 16, the catalyst OSC characteristic becomes larger as the center of the length of the recessed portion 9n approaches the second-end-surface-3b side. As illustrated in FIG. 17, in terms of the catalyst warming up time, both the 50%-purification-achieved time and the 70%-purification-achieved time are shortened as the center of the length of the recessed portion 9n approaches the first-end-surface-3a side, and the warming up characteristic is improved.

Based on the foregoing, the recessed portion 9n is recessed with a length of not less than 5% but not more than 60%, desirably not less than 10% but not more than 50%, and further desirably around 30% of the overall length of the base material 3, within a range of 10% to 90%, desirably 20% to 80% of the overall length of the base material 3 from the first end surface 3a to the second end surface 3b. This makes it possible to improve gas diffusivity and to improve purification performance.

Next will be described the position of the recessed portion 9n, more specifically.

Figure 18:
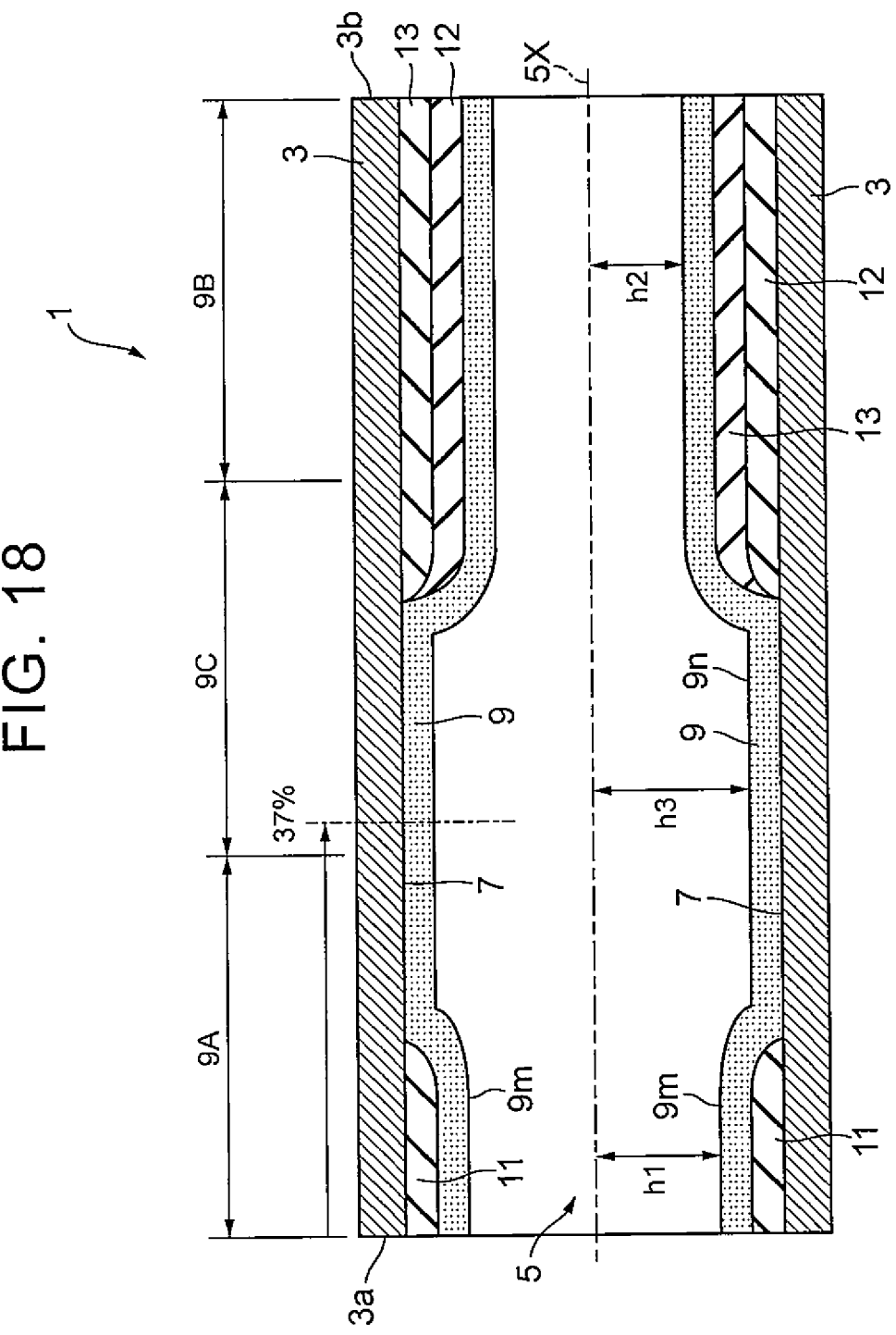
FIG. 18 is a sectional view illustrating a sectional structure of the exhaust gas catalyst according to the embodiment of the present invention.

As illustrated in FIG. 18, the exhaust gas catalyst 1 according to the present embodiment is configured such that, when the first-end-surface-3a side is the exhaust-gas inflow side and the second-end-surface-3b side is an exhaust-gas outflow side, the third region 9C of the catalyst layer 9, namely, the recessed portion 9n is closer to the first-end-surface-3a side than to the second-end-surface-3b side. More specifically, for example, the center of the recessed portion 9n having a length of 34% of the overall length of the base material 3 is placed at a position of 37% of the overall length of the base material 3 from the first end surface 3a toward the second end surface 3b. The other structures except this are basically the same as FIG. 3.

A catalytic activity at the time of engine starting, that is, the warming up characteristic is one of important functions as well as the gas diffusivity. At the time of engine starting, the catalyst is warmed up from the gas inflow side. Accordingly, when the gas diffusivity is increased on the gas inflow side on which the temperature of the catalyst is higher, it is possible to increase the warming up characteristic of the catalyst as illustrated in FIG. 17.

In the exhaust gas catalyst 1 according to the present embodiment, the recessed portion 9n in the third region 9C is closer to the first-end-surface-3a side as the exhaust-gas inflow side than to the second-end-surface-3b side. Accordingly, at the time of engine starting, the catalyst is warmed up from the exhaust-gas inflow side, so that the flow of the exhaust gas can be disturbed on the first-end-surface-3a side on which the temperature is higher, thereby making it possible to improve the exhaust gas diffusivity on the first-end-surface-3a side as the exhaust-gas inflow side. As a result, the exhaust gas catalyst 1 according to the present embodiment can increase the warming up characteristic.

Figure 19:
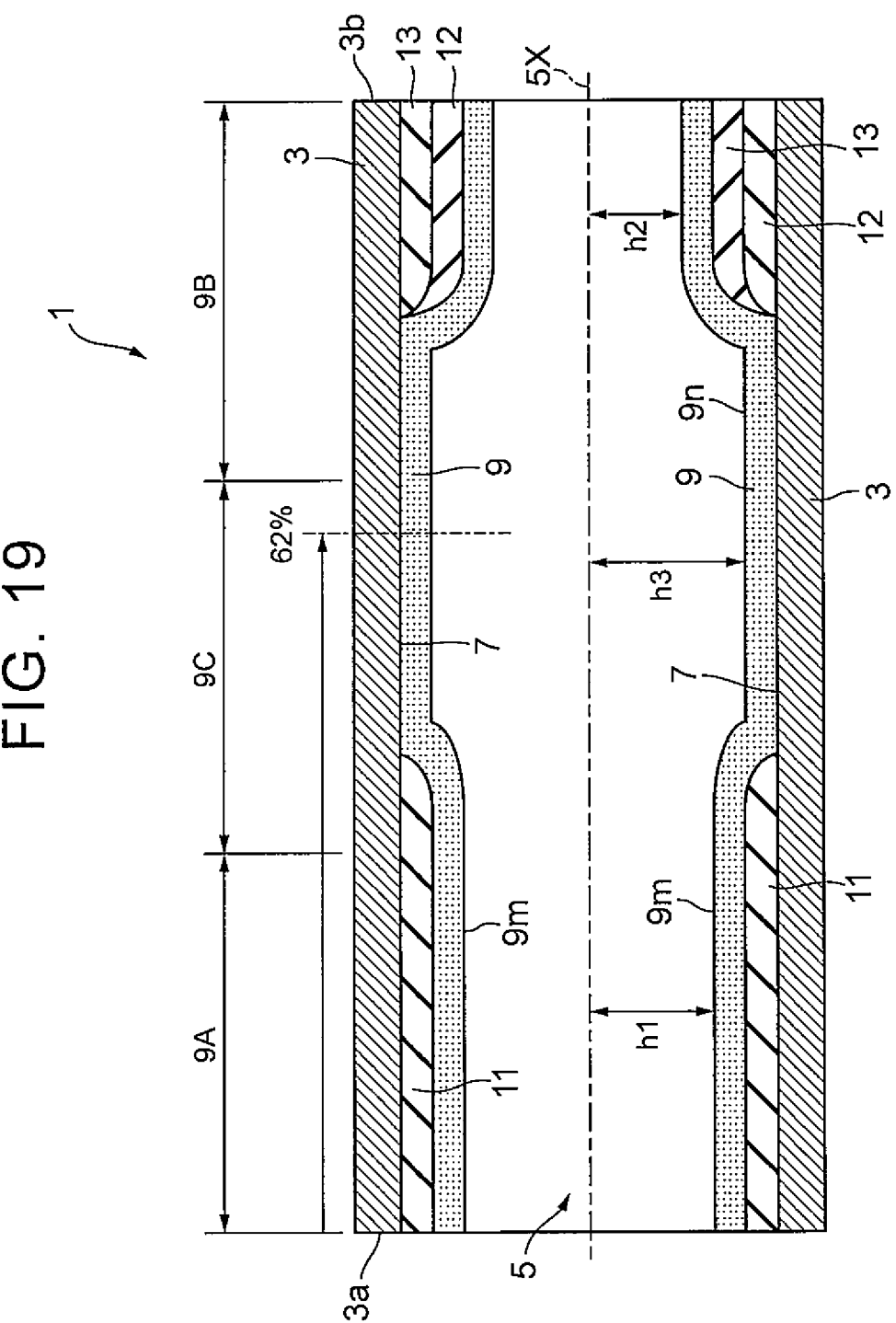
FIG. 19 is a sectional view illustrating a sectional structure of the exhaust gas catalyst according to the embodiment of the present invention.

As illustrated in FIG. 19, the exhaust gas catalyst 1 according to the present embodiment is configured such that, when the first-end-surface-3a side is the exhaust-gas inflow side and the second-end-surface-3b side is the exhaust gas outflow side, the third region 9C of the catalyst layer 9, namely, the recessed portion 9n is closer to the second-end-surface-3b side than to the first-end-surface-3a side. More specifically, for example, the center of the recessed portion 9n having a length of 34% of the overall length of the base material 3 is placed at a position of 62% of the overall length of the base material 3 from the first end surface 3a toward the second end surface 3b. The other structures except this are basically the same as FIG. 3.

In the exhaust gas catalyst 1 according to the present embodiment, the recessed portion 9n in the third region 9C is closer to the second-end-surface-3b side as the exhaust-gas outflow side than to the first-end-surface-3a side. Accordingly, the flow of the exhaust gas can be disturbed on the second-end-surface-3b side, thereby making it possible to improve the exhaust gas diffusivity on the second-end-surface-3b side as the exhaust-gas outflow side. As a result, the exhaust gas catalyst 1 according to the present embodiment can increase the OSC characteristic, as illustrated in FIG. 16.

The exhaust gas catalyst 1 according to the present embodiment deals with a case where the dummy layer is formed between the inner wall surface and the catalyst layer as a technique of satisfying the condition of h3>h1>h2. However, the exhaust gas catalyst 1 according to the present embodiment is not limited to this, and a step may be formed on the inner wall surface 7 of the base material 3, so as to satisfy the condition of h3>h1>h2.

The exhaust gas catalyst 1 according to the present embodiment deals with a case where the dummy layer made of a material that does not contribute to an exhaust gas purification reaction is used, as a technique of satisfying the condition of h3>h1>h2. However, the exhaust gas catalyst 1 according to the present embodiment is not limited to this, and a catalysis layer different in type from the catalyst layer 9 may be used.

Further, the exhaust gas catalyst 1 according to the present embodiment deals with a case where the third region 9C serving as the recessed portion 9n is continuous with both the first region 9A and the second region 9B as sections of the catalyst layer 9. However, the exhaust gas catalyst 1 according to the present embodiment is not limited to this, and another region having a different height from the first region 9A, the second region 9B, and the third region 9C may be formed at least between the third region 9C and the first region 9A or between the third region 9C and the second region 9B.

The exhaust gas catalyst 1 according to the present embodiment deals with a case where a sectional shape of the through hole 5, perpendicular to the central axis 5X, is a rectangular shape. However, the exhaust gas catalyst 1 according to the present embodiment is not limited to this, and the sectional shape of the through hole 5 may be formed in other shapes such as a circular shape, a hexagonal shape, or an octagonal shape.

As described above, the exhaust gas catalyst of the present invention yields an effect of achieving high purification performance, and is useful for an exhaust gas catalyst for purifying exhaust gas discharged from an internal combustion engine such as a gasoline engine or a diesel engine.

DESCRIPTION OF THE REFERENCE NUMERALS

1 . . . exhaust gas catalyst, 3 . . . base material, 3a . . . first end surface, 3b . . . second end surface, 5 . . . through hole, 5X . . . central axis, 7 . . . inner wall surface, 9 . . . catalyst layer, 9A . . . first region, 9B . . . second region, 9C . . . third region, 9m . . . inner surface, 9n . . . recessed portion, 11, 12, 13, 14 . . . dummy layer.

The invention claimed is:

1. An exhaust gas catalyst comprising:
   a base material having a first end surface, a second end surface, and a plurality of inner wall surfaces formed by a plurality of through holes penetrating therethrough from the first end surface to the second end surface; and
   a plurality of catalyst layers formed on the plurality of inner wall surfaces, respectively, wherein:
   each of the through holes has a central axis;
   the first end surface side is an exhaust gas inflow side and the second end surface side is an exhaust gas outflow side;
   each catalyst layer is sectioned into a first region extending from the first end surface toward the second end surface by a predetermined distance, a second region extending from the second end surface toward the first end surface by a predetermined distance, and a third region placed between the first region and the second region;
   the third region of the catalyst layer is closer to the first end surface side than to the second end surface side;
   each catalyst layer is formed such that a distance from the central axis of the through hole to an inner surface of the catalyst layer in the first region of the catalyst layer is smaller than a distance from the central axis of the through hole to the inner surface of the catalyst layer in the third region of the catalyst layer, but larger than a distance from the central axis of the through hole to the inner surface of the catalyst layer in the second region of the catalyst layer;
   each catalyst layer has a uniform thickness in an entire region including the first region, the second region and the third region;
   in each region, each catalyst layer has a constant height;
   the plurality of catalyst layers is made of the same composition in a whole region including the first region, the second region, and the third region,
   at least one dummy layer is formed between the inner wall surface and the catalyst layer in the first region, and
   at least one dummy layer is formed between the inner wall surface and the catalyst layer in the second region; and
   the base material is a monolith honeycomb base material made of a heat-resistant ceramic.

2. The exhaust gas catalyst according to claim 1, wherein the third region has a length of not less than 10% but not more than 50% of the overall length of the through hole.

* * * * *